US011106267B2

(12) United States Patent
Goffman-Vinopal et al.

(10) Patent No.: US 11,106,267 B2
(45) Date of Patent: Aug. 31, 2021

(54) DYNAMIC PROCESSOR CORE FREQUENCY ADJUSTMENT

(71) Applicant: Amazon Technologies, Inc., Seattle, WA (US)

(72) Inventors: Larisa Goffman-Vinopal, Zichron Yaakov (IL); Udi Sherel, Tel Mond (IL); Anat Arbely, Tirat Carmel (IL); Yaniv Shapira, Bet Itzhak (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/698,525

(22) Filed: Nov. 27, 2019

(65) Prior Publication Data
US 2021/0157381 A1 May 27, 2021

(51) Int. Cl.
*G06F 1/00* (2006.01)
*G06F 11/30* (2006.01)
*G06F 1/324* (2019.01)
*G06F 1/08* (2006.01)

(52) U.S. Cl.
CPC ............... *G06F 1/324* (2013.01); *G06F 1/08* (2013.01)

(58) Field of Classification Search
CPC .................................. G06F 1/324; G06F 1/08
See application file for complete search history.

(56) References Cited

U.S. PATENT DOCUMENTS

2012/0110352 A1\* 5/2012 Branover .............. G06F 1/3296
713/300

2015/0019891 A1\* 1/2015 Kumar .................. G06F 1/206
713/322

OTHER PUBLICATIONS

Eyerman, Stijn and Eeckhout, Lieven, "Brief Contributions—A Counter Architecture for Online DVFS Profitability Estimation" Nov. 2010, 8 pages, vol. 59, No. 11.
https://www.intel.com/content/www/us/en/architecture-and-technology/turbo-boost/turbo-boost-max-technology.html, Dec. 4, 2019, 6 pages.
Kidd, Taylor, "Power Management States: P-States, C-States, and Package C-States", 22 pages.
"Products Update for Turbo Boost with Low Power Processor" Apr. 27, 2010, 9 pages.

\* cited by examiner

*Primary Examiner* — Nitin C Patel
(74) *Attorney, Agent, or Firm* — Weaver Austin Villeneuve & Sampson LLP

(57) ABSTRACT

A method for managing clock frequency in a multi-core integrated circuit includes determining a minimum allowable operating clock frequency and a maximum allowable operating clock frequency for an integrated circuit having a plurality of processor cores. A plurality of clock sources is configured to provide a corresponding plurality of clock frequencies between the minimum allowable operating clock frequency and the maximum allowable operating clock frequency. A total number of active processor cores is determined. If it is determined that all of the plurality the processor cores are active, all active processor cores are operated at the minimum allowable operating clock frequency. If it is determined that the total number of active processor cores is lower than a threshold number, the clock frequency of one or more active processor cores is increased based on available electrical current budget.

18 Claims, 9 Drawing Sheets

DYNAMIC PROCESSOR CORE FREQUENCY ADJUSTMENT

BACKGROUND

It is becoming increasingly important to manage power consumption in integrated circuits (ICs), such as computer system processors (e.g., CPUs) and various types of system-on-a-chip (SoC) ICs. In addition to power consumption, performance is also considered in designing computers and other types of processor-based electronic systems. However, a higher performance tends to result in a higher power consumption. Conversely, limiting the amount of power consumed can limit the potential performance of a processor-based electronic system. Achieving the maximum performance per unit of power consumed is a key consideration in the system design.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include mechanisms that manage clock frequencies of microprocessors (e.g., CPUs, SoCs). For highest performance, it is often desirable to run the processor cores at the highest frequency possible. On the other hand, there can be limiting factors, which prevent the processor cores from running at constant maximum frequency. Some limiting factors that prevent cores from always running at the maximum frequency can include temperature and IR (current-resistor) voltage drop. In various embodiments, the frequency can be controlled dynamically; when system conditions allow running at higher frequency, the clock frequency can be boosted. When the system becomes loaded, the frequency can be reduced.

In some embodiments, processor clock frequency management can include two mechanisms to control the operating clock frequency. A clock frequency management unit will enforce hard limitations on maximum frequency (e.g., dictated by IR drop) as a function of a number of active cores. In addition, the clock frequency management unit can perform the actual power up/down of the cores. In this way, frequency can be reduced before powering up additional cores. A thermal monitor unit, either built into the integrated circuit or running on an external chip, can handle the temperature-related frequency adjustment, based on various inputs, such as current temperature, activity of cores and other units on the chip. Both mechanisms can work in parallel and the minimum frequency will be used in this case.

In some embodiments, the integrated circuit can have independent clock trees per quarter, so that the decision which cores run at nominal frequency and which cores run at selected accelerated frequencies can be done per quarter.

Figure 1:
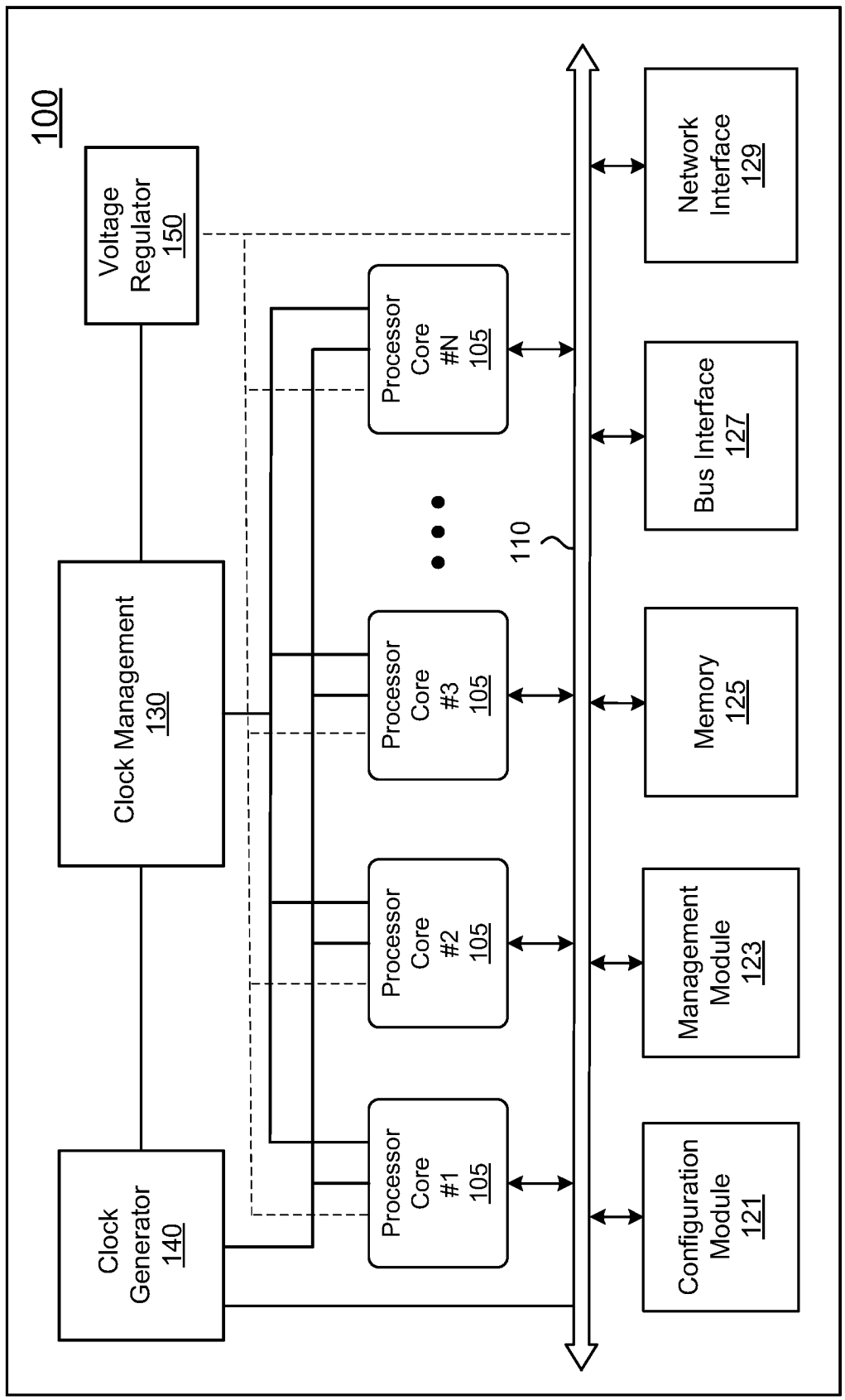
FIG. 1 is a block diagram illustrating an integrated circuit, according to certain aspects of the disclosure.

FIG. 1 is a block diagram illustrating an integrated circuit, according to certain aspects of the disclosure. FIG. 1 shows an integrated circuit (IC) 100, which can be a system-on-a-chip (SOC), a CPU, or another type of integrated circuit. In the example of FIG. 1, integrated circuit 100 includes a number of processor cores 105 (which in some embodiments are CPU cores), also designated as processor Core #1, processor Core #2, processor Core #N, and so forth. Each processor core 105 is coupled to a communication channel 110 in the embodiment shown. Communication channel 110 may provide a wide variety of interface functions for each of processor cores 105, including interfaces to memory and to various peripherals.

In the example of FIG. 1, integrated circuit 100 may include a processing logic 120, a management module 121, a configuration module 123, a memory 125, a bus interface module 127, and a network interface module 129. These modules may be hardware modules, software modules, or a combination of hardware and software. The integrated circuit 100 may include additional modules, not illustrated here. One or more of the modules may be in communication with each other over communication channel 110. The communication channel 110 may include one or more busses, meshes, matrices, fabrics, a combination of these communication channels, or some other suitable communication channel More details about these components are described below in connection with FIG. 9.

In various embodiments, the number of processor cores 105 may be as few as two, or may be as many as feasible for implementation on an IC die. In multi-core embodiments, processor cores 105 may be identical to each other, or one or more processor cores 105 may be different from others. Processor cores 105 may each include one or more execution modules, cache memories, schedulers, branch prediction circuits, etc.

Integrated circuit 100 also includes a clock management unit 130 that is configured to manage the clock frequency of each of processor cores 105. Integrated circuit 100 also includes a clock generator module 140, coupled to the clock management unit 130, which provides a plurality of clock frequencies. In some implementations, the clock generator module 140 is configured to provide a plurality of clock frequencies between a pre-determined minimum allowable operating clock frequency and a pre-determined maximum clock operating frequency.

The clock management functions performed by clock management unit 130 may include varying the clock frequencies based at least in part on the activity level of processor cores 105. The clock management unit 130 may vary the clock frequency for each processor core to improve the performance. For example, clock management unit 130 may increase the frequency of a clock signal provided to a processor core 105.

In some implementations, the clock management unit 130 is configured to operate all the processor cores at the minimum allowable operating clock frequency. During operation, the clock management unit 130 determines a total number of active processor cores. Upon determining that the total number of active processor cores is lower than a threshold number, the clock management unit 130 increases the clock frequency of active processor cores to improve the performance, based on the total number of active processor cores. In other implementations, the clock management unit 130 can also increase the clock frequency of active processor cores to improve the performance, based on the thermal conditions of the integrated circuit. The functions of the clock management unit 130 are described in more detail below.

In various implementations, clock management unit 130 may track activities of the processor cores over a period of time. The activities can include total number of instructions executed, high-power instruction, etc.

In the embodiment shown, integrated circuit 100 can also include voltage regulator 150. In other implementations, voltage regulator 150 may be implemented separately from integrated circuit 100. Voltage regulator 150 may provide a supply voltage to each of processor cores 105. In some implementations, voltage regulator 150 may provide a supply voltage that is variable according to a particular operating point. For example the voltage can be increased for greater performance, and decreased for greater power savings.

Figure 2:
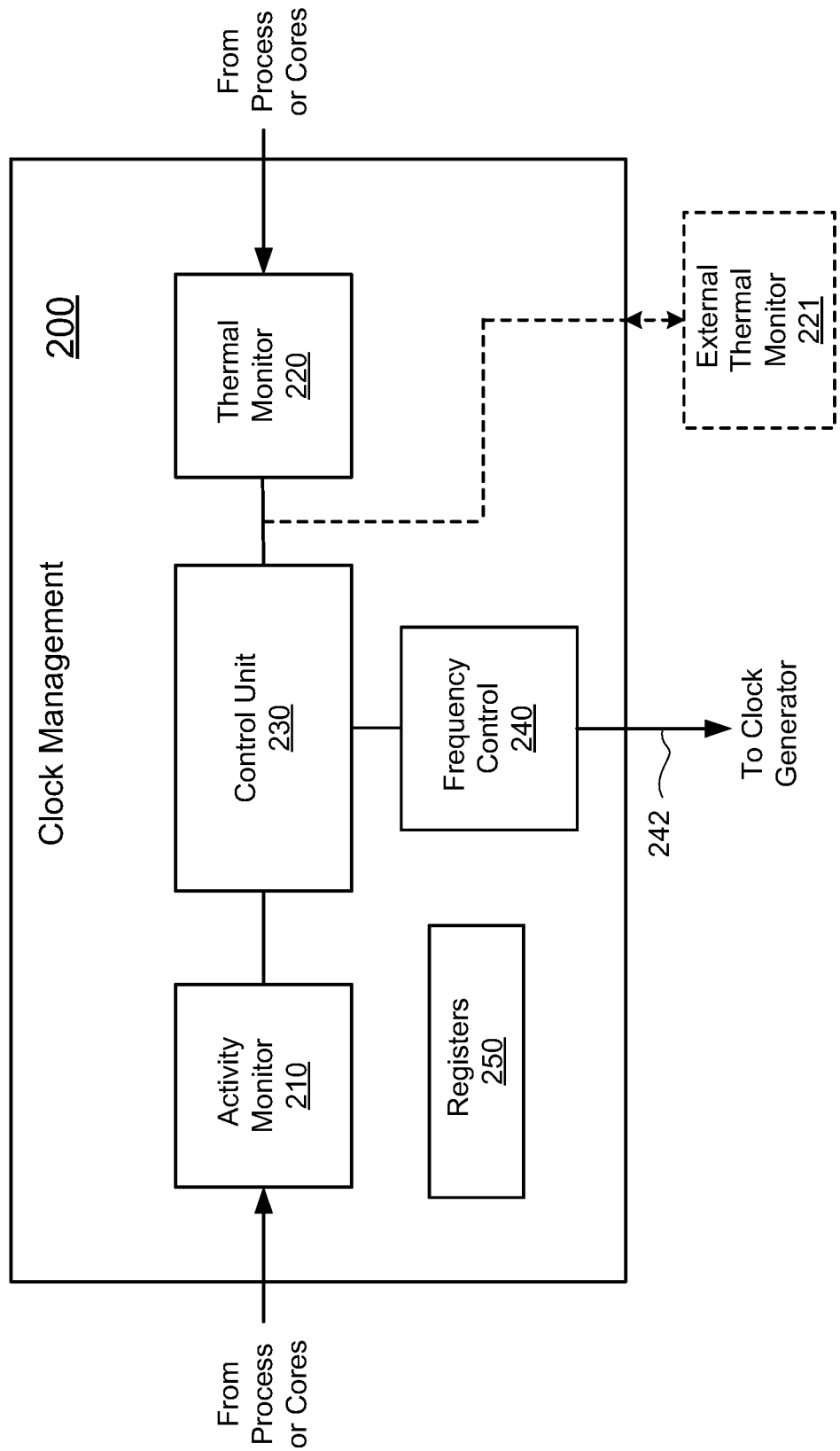
FIG. 2 is a block diagram illustrating a clock management unit, according to certain aspects of the disclosure.

FIG. 2 is a block diagram illustrating clock management unit 200, according to certain aspects of the disclosure. Clock management unit 200 is one possible implementation of the clock management unit 130 in FIG. 1. In the example, clock management unit 200 includes an activity monitor 210, a thermal monitor 220, a control unit 230, and a frequency control module 240. Clock management unit 200 can also include various registers 250 to facilitate configuration and control functions. In some embodiments, the control unit 230 can be implemented in hardware, e. g., calculation unit, arbiter unit to handle requests from the processor cores, etc. In some embodiments, some of the functions can also be implemented in software. A more detailed example of clock management unit 200 is described below with reference to FIGS. 6-8.

The activity monitor 210 is coupled to the processor cores 105 to receive indications of activities from various processor cores 105 as shown in FIG. 1. In various implementations, activity monitor 210 is configured to store and analyze information related to the recent activity levels for each of the processor cores 105, and may also store information related to the history of activity. For example, activity monitor 210 can receive a signal from each processor core that indicates whether that processor core is active, the activities during a certain time window, and the current being consumed by the processor core. The activity monitor 210 can also determine a weight that is based on the activity level of the processor core. More generally, activity monitor 210 may be coupled to receive activity indications from various different types of functional modules implemented on integrated circuit 100. For example, activity monitor 210 may receive information about power consumption or current flow in the functional modules other than the processor cores.

The thermal monitor 220 is coupled to the processor cores 105 to receive and store indications of thermal conditions from various processor cores 105 as shown in FIG. 1. For example, the thermal monitor 210 can receive signals from temperature sensors placed near the processor cores that indicate the temperature of the processor cores. In some embodiments, the thermal monitor function may be performed by a controller external to the integrated circuit. For example, an external thermal monitor 221 is shown in broken lines in FIG. 2, which may communicate with the clock management unit 200 through an interface circuit, such as a PCI (Peripheral Component Interconnect) interface.

Clock management unit 200 in this example also includes a frequency control module 240. Frequency control module 240 is configured to receive instruction signals from the control unit 230, and to generate clock control signals 242 for the clock generator 140 in FIG. 1 for adjusting the frequency of the clock signals provided to each of the processor cores. In some cases, all active processor cores can have clock signals at the same frequency. In other cases, the frequency of a clock signal provided to a given one of processor cores 105 may be adjusted independently of the clock signals provided to the other processor cores. The clock control signals 242 may be provided to the clock generator 140. Frequency control module 240 may generate control signals based on information provided by the control unit 230. For example, frequency control module 240 may generate control signals based on activities of the processor cores or the thermal conditions of the processor cores provided by the control unit 230A more detailed example of frequency control module 240 is described below with reference to FIGS. 6-8.

Figure 3:
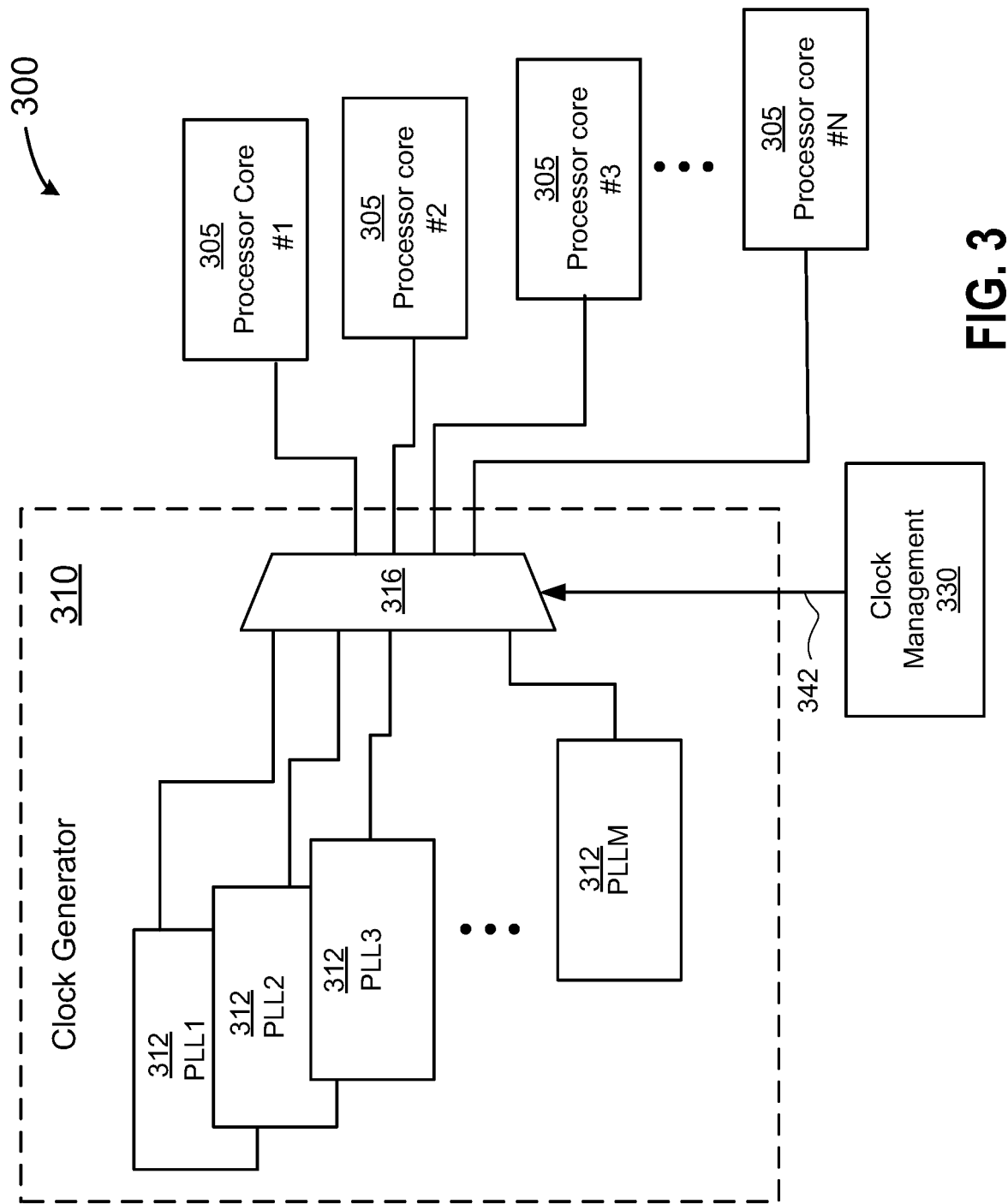
FIG. 3 is a block diagram illustrating a portion of an integrated circuit, according to certain aspects of the disclosure.

FIG. 3 is a block diagram illustrating a portion of an integrated circuit, according to certain aspects of the disclosure. FIG. 3 shows a portion of an integrated circuit (IC) 300, which includes a number of processor cores 305, also designated as processor Core #1, processor Core #2, processor Core #N, and so forth. Processor cores 305 can be similar to processor cores 105 described above in connection to FIG. 1.

Integrated circuit 300 also includes a clock generator 310, which can be used as clock generator 140 in FIG. 1. In the example illustrated in FIG. 3, clock generator 310 can include a number of clock sources, e. g., phase-locked loops (PLLs) 312, also designated as PLL1, PLL2, PLLM, and so forth. A phase-locked loop (PLL) is a closed-loop frequency-control system based on the phase difference between an input clock signal and a feedback clock signal of a controlled oscillator. The main blocks of the PLL can include a phase detector, a loop filter, and a voltage controlled oscillator (VCO). A PLL can also multiply a lower-frequency reference clock up to a higher operating frequency. A divider counter can be inserted in the feedback loop to increase the VCO frequency above the input reference frequency. The divider counter can be configured to provide different frequencies. Therefore, each of PLLs 312 can be a programmable PLL that is programmed to provide a selected clock frequency. In some examples, the clock generator 310 can include on-chip PLLs on the integrated circuit. In other examples, the clock generator 310 can receive multiple clock signals from external clock generators, such as external PLLs. The clock generator 310 also has a selection circuit 316, such as a multiplexer, for coupling clock signals from the clock sources to the processor cores 305.

Integrated circuit 300 can also include a clock management unit 330, similar to clock management unit 130 in FIG. 1 or clock management unit 200 in FIG. 2. Clock management unit 330 can provide clock control signals 342 to the clock generator 310 for selecting the clock signals to the processor cores 305 to adjust the frequency of the clock signals provided to each of the processor cores.

Figure 4:
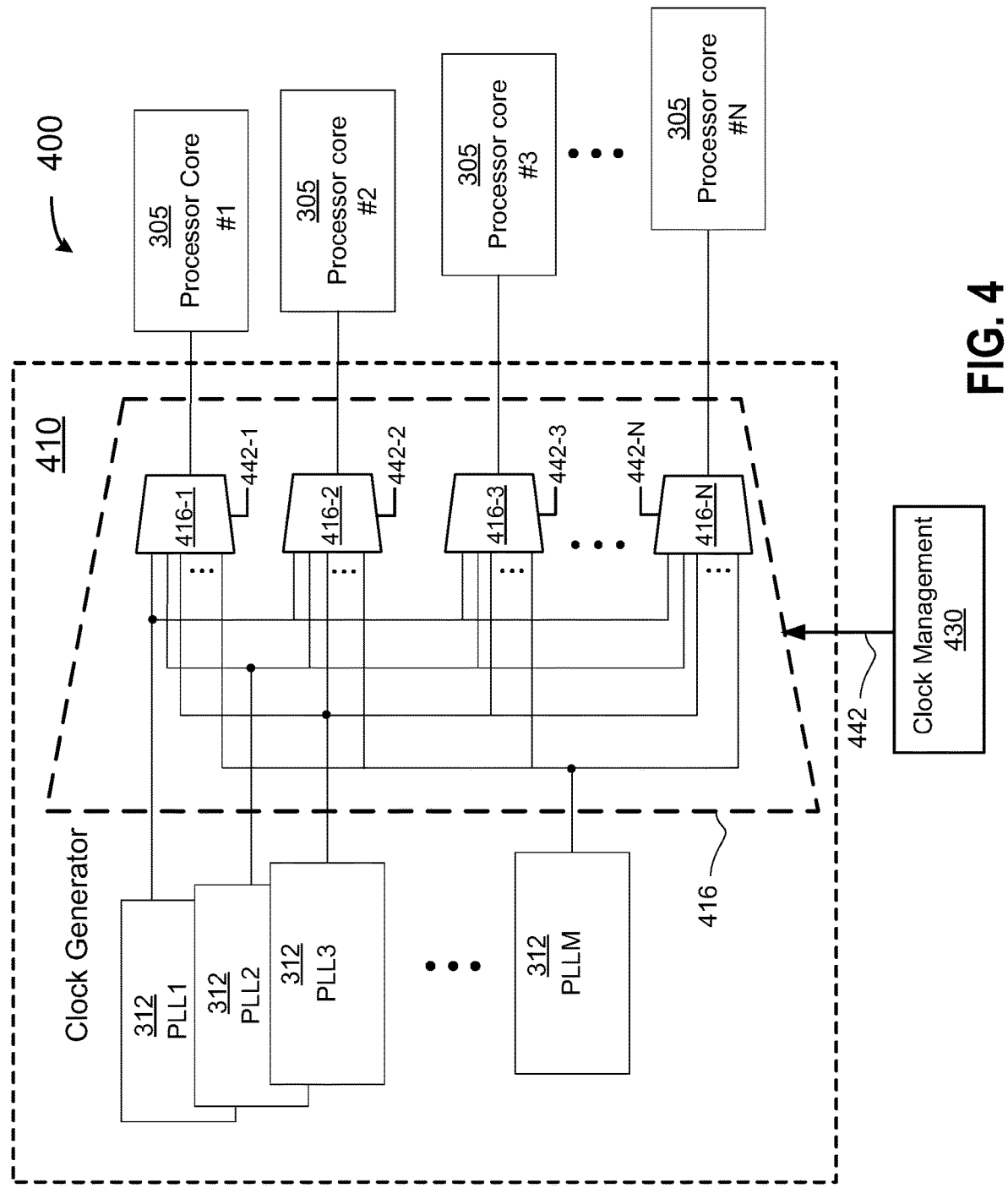
FIG. 4 is a block diagram illustrating a portion of an integrated circuit, according to certain aspects of the disclosure.

FIG. 4 is a block diagram illustrating a portion of an integrated circuit, according to certain aspects of the disclosure. FIG. 4 shows a portion of an integrated circuit 400 that has similar components as integrated circuit 300 in FIG. 3. For example, integrated circuit 400 includes a number of processor cores 305, also designated as processor Core #1, processor Core #2, processor Core #N, and so forth, where N is an integer. Processor cores 305 can be similar to processor cores 105 described above in connection to FIG. 1.

Integrated circuit 400 also includes a clock generator 410, which can be used as clock generator 140 in FIG. 1. Similar to clock generator 310 illustrated in FIG. 3, clock generator 410 in FIG. 4 can include a number of clock sources, e. g., phase-locked loops (PLLs) 312, also designated as PLL1, PLL2, PLLM, and so forth, where M is an integer. Each of PLLs 312 can be a programmable PLL that is programmed to provide a certain clock frequency. In some examples, the clock generator 410 can include on-chip PLLs as part of the integrated circuit. In other examples, the clock generator 410 can receive multiple clock signals from external clock generators, such as external PLLs.

The clock generator 410 also has a selection circuit 416 that includes N multiplexers 416-1, 416-2, 416-3, 416-N, where N is an integer, for coupling clock signals from the clock sources to the processor cores 305. Each of the N multiplexers is an M-to-1 multiplexer that allows the selection of any one of the M PLLs to each of the N corresponding processor cores. Each of the N multiplexers receives a corresponding selection signal 442-2, 442-3, and 442-N.

Integrated circuit 400 also includes a clock management unit 430, similar to clock management unit 130 in FIG. 1 or clock management unit 200 in FIG. 2. Clock management unit 430 can provide clock control signals 442 to the clock generator 410. In the example of FIG. 4, clock control signals 442 can include N selection signals, 442-1, 442-2, 442-3, and 442-N, for selecting the clock signals to the processor cores 305 to adjust the frequency of the clock signals provided to each of the processor cores.

Figure 5:
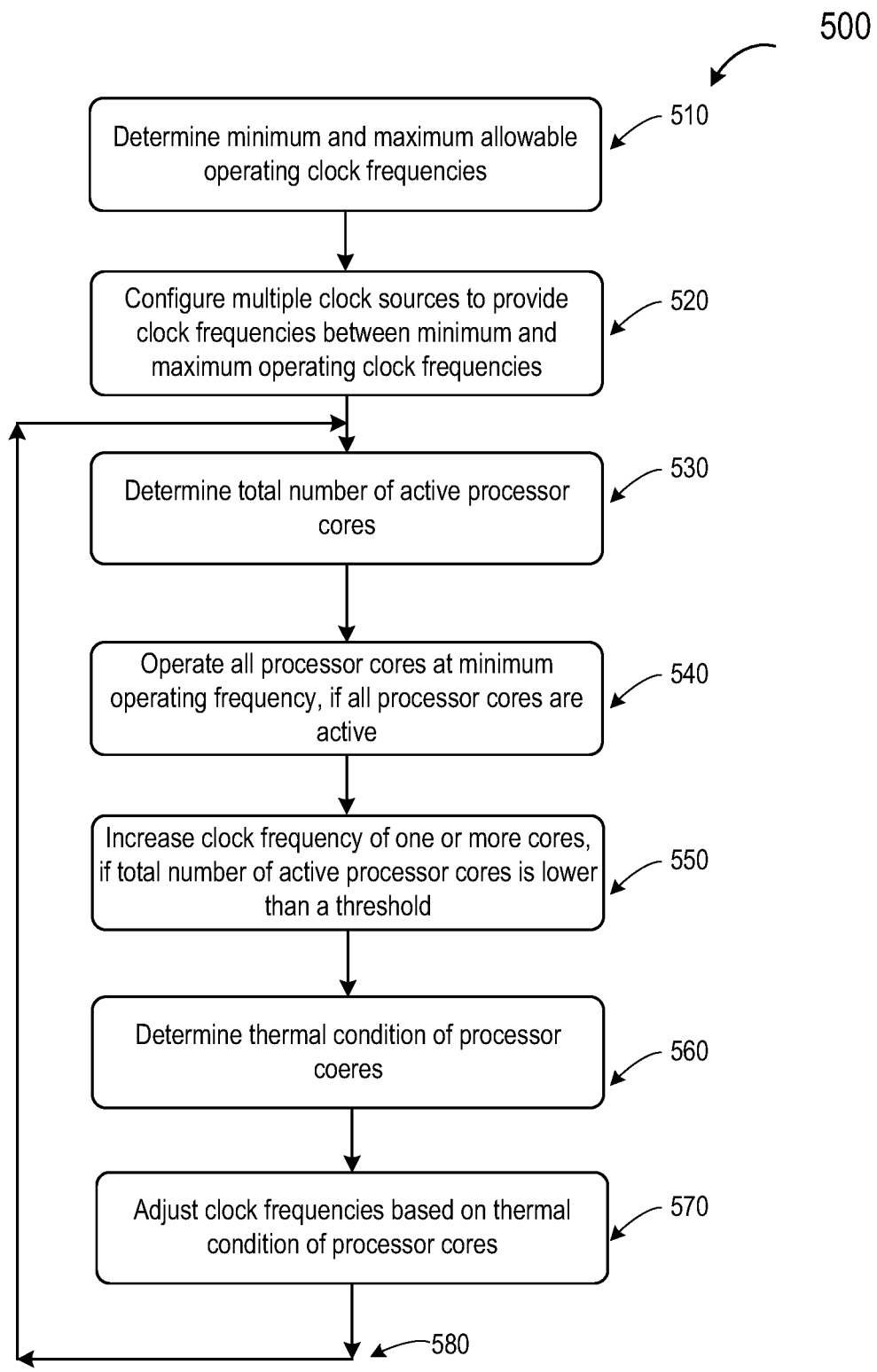
FIG. 5 is a flowchart illustrating a method for clock frequency control in a multi-core integrated circuit, according to certain aspects of the disclosure.

FIG. 5 is a flowchart illustrating a method for clock frequency control in a multi-core integrated circuit, according to certain aspects of the disclosure. Method 500 in FIG. 5 is described with reference to the device illustrated above in connection with FIGS. 1-4.

At 510, a minimum allowable operating clock frequency and a maximum allowable operating clock frequency are determined for an integrated circuit having a plurality of processor cores. An example of an integrated circuit having a plurality of processor cores is described above in connection to FIG. 1. Depending on the application, the integrated circuit may operate with all the processor cores being active or only a subset of the processor cores being active. Further, some of the cores may operate at a nominal clock frequency, and some of the cores may operate at various accelerated clock frequencies up to the maximum allowable operating clock frequency.

The cores that operate at the nominal clock frequency are referred to as being in a nominal mode, and the cores that operate at an accelerated clock frequency are referred to as being in an accelerated mode or an ACCL (accelerated) mode.

As an example, a multi-core integrated circuit may have a minimum allowable operating clock frequency of 2.0 GHz and a maximum allowable operating clock frequency of 3.0 Ghz. Five PLLs can be configured to provide clock signals of f1=2.0 GHz, f2=2.2 Ghz, f3=2.4 GHz, f4=2.7 GHz, and f5=3.0 GHz, respectively. In this case, the nominal mode would be operating at 2.0 GHz, and the accelerated or ACCL mode could be operating at 2.2 Ghz, 2.4 GHz, 2.7 GHz, or 3.0 GHz. Alternatively, f1=2.0 GHz can be used in a low-power mode, f2=2.2 Ghz can be used in the nominal mode, and f3=2.4 GHz, f4=2.7 GHz, and f5=3.0 GHz can be used in the ACCL mode. In various implementations, the minimum allowable operating clock frequency and the maximum allowable operating clock frequency can be determined based on one or more performance factors, such as power consumption, circuit limitations, and production yields, etc. For example, following chip characterization, it may be observed that there are hard frequency limitations that need to be applied in order to keep the chip stable. In this case, it may be desirable to reduce frequency before powering up additional cores to make sure the system never reaches an unstable state. Clock management unit 130 can control both maximum allowed frequency and the power up/down sequence of the processor cores.

In some embodiments, clock management unit 130 does not control voltage level. In these cases, the voltage is constant (at ACCL level) in the ACCL mode. In other embodiments, multiple voltage levels can be used for the processor cores. For example, in the nominal mode, a regular operation voltage level can be used, with a constant processor frequency. In the ACCL mode, higher voltage levels can be used, and the processor frequency can be managed by a dynamic frequency switching logic described below.

In these examples, the same voltage level will be used for all active cores at a given time. The control over the voltage levels can be controlled either internally in the integrated circuit or by a controller running on an external chip.

At 520, a plurality of clock sources are configured to provide a corresponding plurality of clock frequencies between the minimum operating frequency and the maximum operating frequency. As an example, the plurality of clock sources can be provided by the clock generator 140 in integrated circuit 100 in FIG. 1. The clock generator 140 can include a plurality of phase locked loops (PLLs). The PLLs can be configured to provide different frequencies. For example, one of the PLLs can be configured to provide a clock having a clock frequency of the minimum allowable operating clock frequency, and a second PLL can be configured to provide a clock having a clock frequency of the maximum allowable operating clock frequency. The other PLLs can be configured to provide a clock having a clock frequency somewhere between the minimum allowable operating clock frequency and the maximum allowable operating clock frequency.

At 530, the activities of the processor cores are monitored, and the total number of active processor cores is determined. As described above, the clock management unit 330 monitors the state of each of the processor cores to determine whether a given processor core is active or inactive. In some cases, all of the processor cores may be active, and all of the processor cores may operate at a predetermined clock frequency. In other cases, only some of the processor cores may be active. In the latter cases, the power consumption limitations or available electrical current budget may allow some processor cores to operate at higher clock frequencies.

At 540, it may be determined that, for an operation of the integrated circuit, all the processor cores are active. In this case, all the active processor cores can operate at the minimum allowable operating clock frequency within the power or electrical current limit. This can be implemented by providing the selection circuit 316 with a signal causing it to connect the PLL that is generating the minimum allowable operating clock frequency to all the processor cores.

At 550, upon determining that the total number of active processor cores is lower than a threshold number, the clock frequency of one or more active processor cores may be increased. Under this condition, the power consumption limitations or available electrical current budget may allow some processor cores to operate at higher clock frequencies. In some cases, all active cores can be candidates for higher clock frequencies in the ACCL mode. In other cases, some of the active processor cores may be selected to operate at higher clock frequencies in the ACCL mode. The threshold number can be determined based on post-silicon characterization and stored in a configuration file. A more detailed method for selecting the clock frequencies is described below in connection with FIGS. 6 and 7.

At 560, the thermal conditions of the processor cores are monitored, and the temperatures of the processor cores are determined. As described above, the clock management unit 330 monitors the state of each of the processor cores to determine the temperature of a given processor core. As an example, the integrated circuit 100 can include a plurality of temperature sensors distributed over the integrated circuit. There can be a temperature sensor associated with each processor core. Alternatively, the integrated circuit can include multiple regions, each region can include a number of processor cores, and one or more temperature sensors can be associated with each region that can include multiple processor cores.

At 570, the clock frequencies of the processor cores are adjusted based on the temperature of the integrated circuit. For example, if the temperature is too high, the clock frequency can be lowered. On the other hand, if the temperature is lower than a temperature threshold, the clock frequency can be increased. A method for selecting the clock frequencies is described below in connection with FIGS. 6 and 8.

At 580, the method can include repeating the above processes to continuously monitor the activities of the processor cores and to vary the clock frequencies to improve the performance of the integrated circuit.

Figure 6:
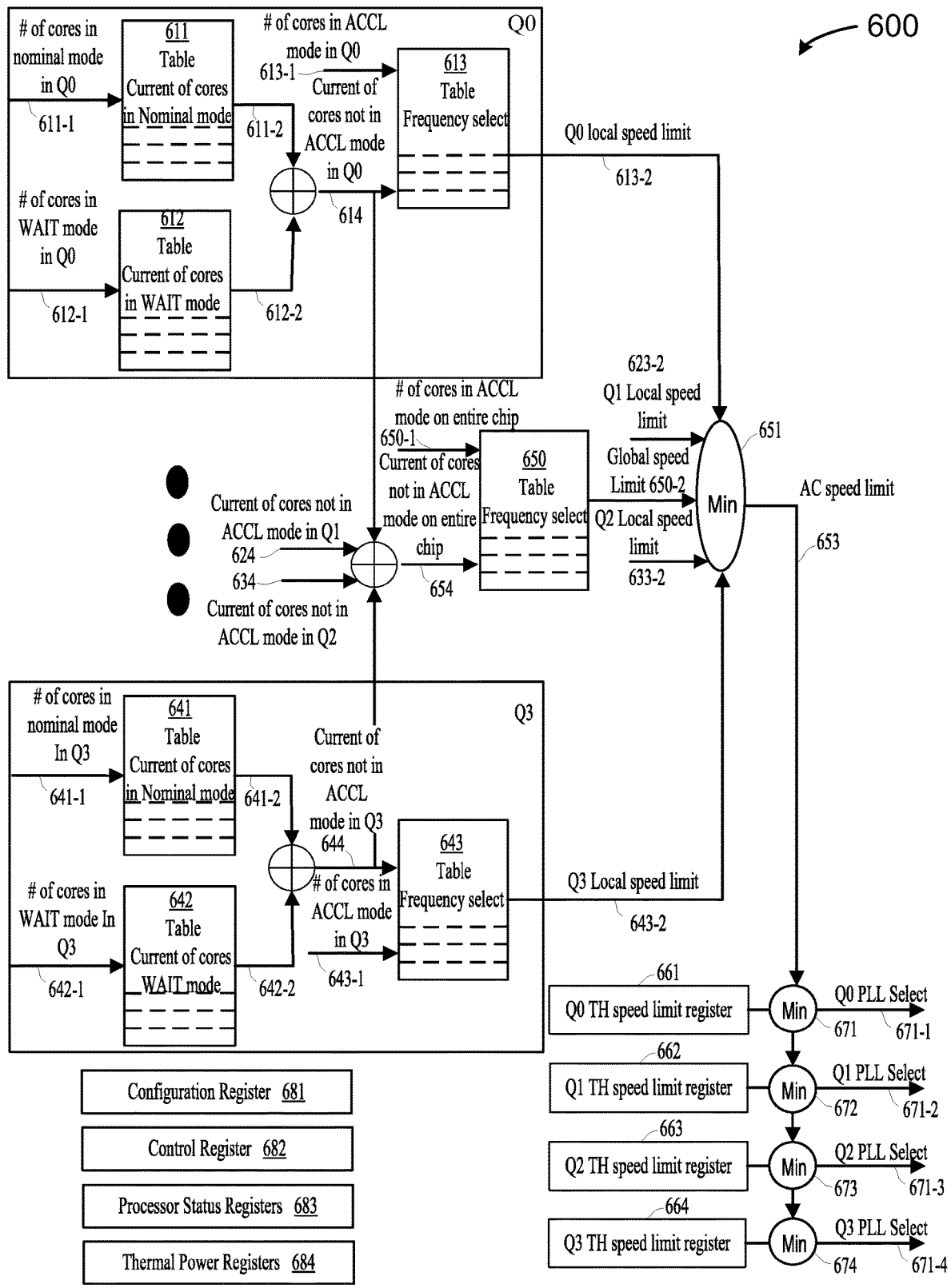
FIG. 6 is a block diagram illustrating a clock management unit 600 for clock frequency control in a multi-core integrated circuit according to certain aspects of the disclosure.

FIG. 6 is a block diagram illustrating a portion of a clock management unit 600 for clock frequency control in a multi-core integrated circuit according to certain aspects of the disclosure. Clock management unit 600 is another possible implementation of the clock management unit 200. FIG. 6 illustrates certain functional blocks that perform functions corresponding to control unit 230, frequency control unit 240, and registers unit 250 in the clock management unit 200. To simplify the drawing, FIG. 6 omits other functional units, such as those that correspond to the activity monitor 210 and thermal monitor unit 220 in the clock management unit 200. Clock management unit 600 receives indications about the state of every core and uses those indications to enforce the frequency limitations. In some embodiments, there are three possible states for every core: (1) powered-down, (2) wait, and (3) active. Further, each core in the active state can operate in a nominal mode or in an ACCL (or accelerated) mode. In the nominal mode, the core operates at a normal clock frequency, and in the ACCL mode, the core operates at a raised clock frequency. A weight for every core can be retrieved from a configuration file. The frequency can be set according to the sum of weights. Clock management unit 600 can also get power down and wake-up requests for every core. Upon receiving a wake-up request when frequency lowering is required, clock management unit 600 can lower the frequency before waking up the core. Clock management unit 600 can also get a WAIT indication and a Wake-Up request for every core. Upon receiving the Wake-Up request, when frequency lowering is required, clock management unit 600 can lower the frequency before acknowledging the Wake-Up request.

The plurality of processor cores in the multi-core integrated circuit can be grouped into multiple subsets. For example, the example of FIG. 6, the plurality of processor cores in the multi-core integrated circuit is grouped into four subsets, or four quadrants, Q0, Q1, Q2, and Q3. For example, in a 64-core system, quadrants Q0-Q4 can each include 16 processor cores. It is understood that the grouping of processor cores into quadrant in FIG. 6 is merely an example, and any suitable grouping can be used. As shown in FIG. 6, quadrant Q0 includes a first table 611 that lists the electrical current of the cores in quadrant Q0 operating in the nominal mode. The first table 611 receives as an input the number of cores operating in the nominal mode 611-1. Quadrant Q0 also includes a second table 612 that lists the electrical current of the core in the WAIT mode. The second table 612 receives as an input the number of cores operating in the WAIT mode 612-1. The first table 611 and the second table 612 can be lookup tables including pre-determined values. Alternatively, these tables can be updated by the clock management unit to reflect up-to-date current flow values. A sum of the currents 614 from tables 611 and 612 represents the current of processor cores not in the ACCL mode in quadrant Q0. The sum of the currents 614 is input to a third table 613, which is a lookup table for quadrant Q0 that lists raised frequency entries based on the available electrical current for the cores in ACCL mode 613-1. The third table 613 receives as an input the number of cores not operating in the nominal mode 613-1. The output of table 613 is a local speed limit 613-2, which is an allowed clock frequency, for quadrant Q0. An example of the process used in determining the frequency entries in the third table 613 is described below with reference to FIG. 7. The units and modules described herein may be software modules, hardware modules, or a suitable combination thereof.

In FIG. 6, quadrants Q1, Q2, and Q3 have similar structures as Q0. To simplify the figure, only the structures of quadrant Q3 are illustrated. As shown in FIG. 6, quadrant Q3 includes a first table 641 that lists the electrical current of the cores in quadrant Q3 operating in the nominal mode. The first table 641 receives as an input the number of cores operating in the nominal mode 641-1. Quadrant Q3 also includes a second table 642 that lists the electrical current of the core in the WAIT mode. The second table 642 receives as an input the number of cores in operation in the nominal mode 642-1. A sum of the currents 644 from tables 641 and 642 represents the current of processor cores not in the ACCL mode in quadrant Q3. The sum of the currents 644 is input to a third table 643, which is a lookup table quadrant Q3 that lists raised frequency entries based on the available electrical current for the cores in ACCL mode 643-1. The third table 643 receives as an input the number of cores in not operating in the nominal mode 643-1. The output of table 643 is a local speed limit 643-2, which is an allowed clock frequency, for quadrant Q3.

In FIG. 6, current 624 is a value describing the current of processor cores not in the ACCL mode in quadrant Q1, and current 624 is a value describing the current of processor cores not in the ACCL mode in quadrant Q2. The sum of currents 614, 624, 634, and 644 is the total current of processor cores not in the ACCL mode on the integrated circuit, and is designated as current 654. Total current 654 is used to determine available electrical current that can be allocated to the processor cores in the ACCL mode to operate with raised clock frequency. As explained in more detail below with reference to the method of FIG. 7, a global lookup table 650, for the integrated circuit as a whole including quadrants Q0, Q1, Q2, and Q3, is used to determine the clock frequency for processor cores to operate in ACCL mode, based on the total available electrical current and the number of processor cores to operate in ACCL mode 650-1. The output of global lookup table 650 is a global speed limit 650-2, which is an allowed clock frequency for the integrated circuit.

The local speed limits for each of quadrants 613-2, 623-2, 633-3, and 643-2, along with the global speed limit 650-2 are input to a minimum block Min 651, which takes the minimum of the input speed limits and determines a clock speed limit 653, which can include the raised clock frequency for the processor cores in the ACCL mode (or accelerated mode) based on the number of active cores and the electrical current specification. Clock speed limit 653 is also referred to as the AC speed limit to note that it is related to the activities of the processor cores, and to distinguish from the clock speed limits, the TH speed limits, based on thermal considerations described below.

In some implementations, thermal considerations also play a role in the determination of clock frequencies. As described below in connection with FIG. 8, the temperature of the integrated circuit or regions of the integrated circuit can be used as a parameter in raising or lowering the clock frequencies of the processor core. In the example of FIG. 6, four TH speed limit registers provide the clock speed limits based on thermal analysis: Q0 TH speed limit register 661, Q1 TH speed limit register 662, Q2 TH speed limit register 663, and Q3 TH speed limit register 664. These speed limits are compared with the AC speed limit 653 to determine the clock frequency for each quadrant and provide PLL selection signals for each quadrant. FIG. 6 shows a first minimum circuit 671 providing the minimum of the output of Q0 TH speed limit register 661 and AC speed limit 653 and outputting a Q0 PLL select signal 671-1. Similarly, a second minimum circuit 672 provides the minimum of the output of Q1 TH speed limit register 662 and AC speed limit 663 and outputs a Q1 PLL select signal 672-1. A third minimum circuit 673 provides the minimum of the output of Q2 TH speed limit register 663 and AC speed limit 653 and outputs a Q2 PLL select signal 673-1. A fourth minimum circuit 673 provides the minimum of the output of Q3 TH speed limit register 664 and AC speed limit 653 and outputs a Q3 PLL select signal 674-1.

As shown in FIG. 6, clock management unit 600 can also include various registers for implementing monitor and control functions. The registers can include a configuration register 681, a control register 682, processor status registers 683, and thermal power registers 684, etc. For example, the configuration register 681 and the control register 682 can be used in PLL selection generation. Processor status registers 683 can be used to keep track of the status of the processor cores. The thermal power registers 684 can be used for management of clock frequencies based on thermal conditions of the integrated circuit.

In some implementations, when some of the processor cores are not in operation, the power or electrical current budget may allow some of the active cores to operate at accelerated clock frequencies. In some implementations, the clock management unit 600 can decide which clock frequency to choose based on the available electrical current budget for the integrated circuit. Clock management unit 600 can execute algorithms to make decisions based on activity levels of the processor cores and other units in the integrated circuit, as well as the power budget and electrical current budget of the integrated circuit. For example, clock management unit 600 can read out all activity indications from the integrated circuit and define the total power budget.

Figure 7:
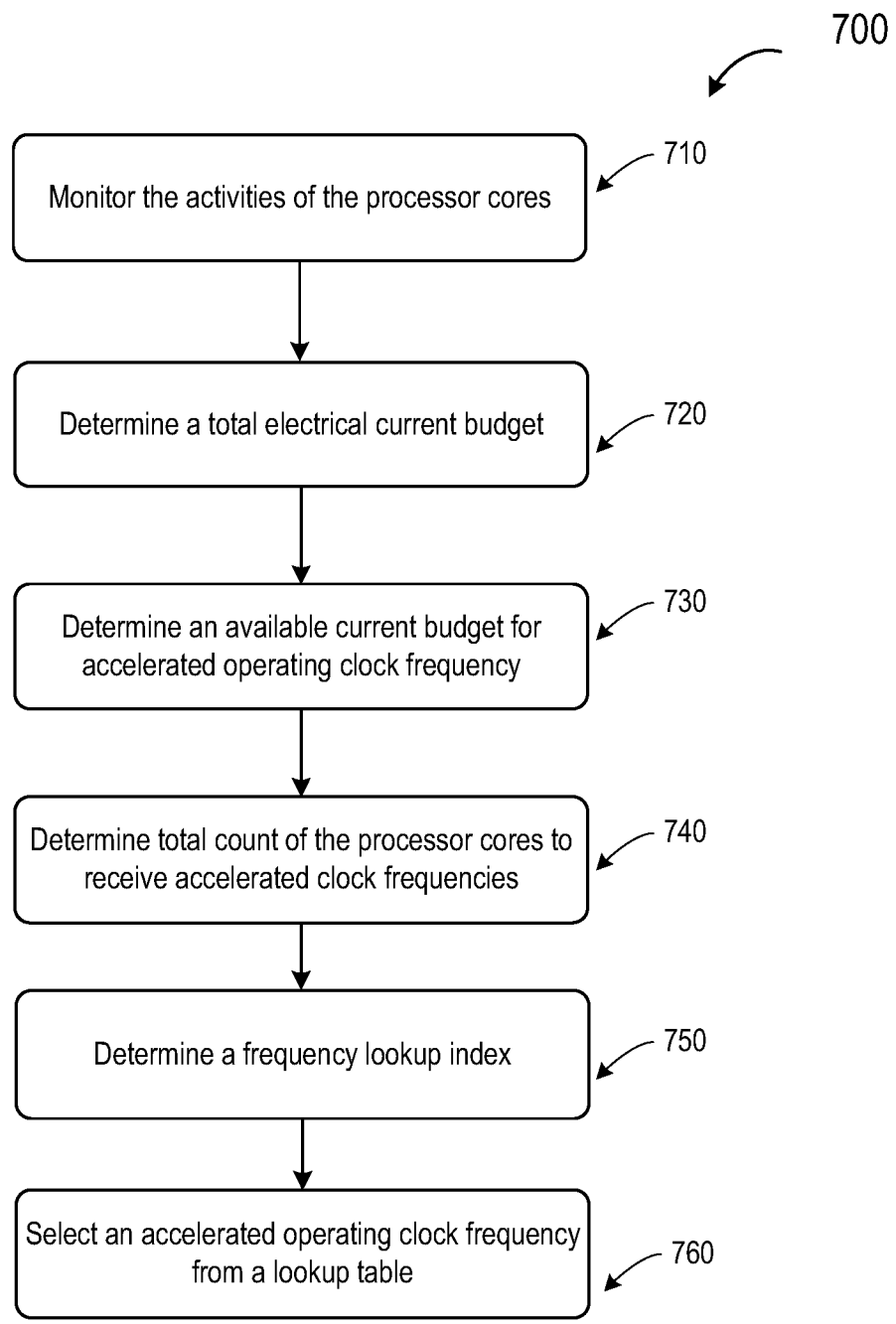
FIG. 7 is a flowchart illustrating a method for selecting an operating clock frequency based on activity levels for a multi-core integrated circuit, according to certain aspects of the disclosure.

FIG. 7 is a flowchart illustrating a method for selecting an operating clock frequency based on electrical activity levels for a multi-core integrated circuit, according to certain aspects of the disclosure. As shown in the example of FIG. 7, method 700 can include the following processes.

At 710, the method can include monitoring the activities of the processor cores. For example, the monitoring can be carried out by the activity monitor 210 of clock management unit 200 in FIG. 2. Depending on the implementation, the activity monitor 210 can determine the number of active processor cores, as well as activity levels of the processor cores.

At 720, a total electrical current budget for the integrated circuit is determined, which is expressed as $CB_{total}$. This value can be determined based on the power consumption requirement and circuit performance requirement. This value can also be configurable through a register.

At 730, an available current budget is determined for accelerated operating clock frequencies. Since an increased clock frequency can increase the current flow, the amount of the available current budget is needed to decide the allocation of various accelerated clock frequencies. The total electrical current budget for the integrated circuit can be calculated as follows.

$$CB_{avail} = CB_{total} - n_{WAIT} \cdot w_{WAIT} - n_{nominal} \cdot w_{nominal}$$

where:
$n_{WAIT}$—# of cores in WAIT mode;
$n_{nominal}$—# of cores that requested nominal frequency;
$n_{ACCL}$—# of cores participating in ACCL mode;
$w_{WAIT}$—weight of core in WAIT mode; and
$w_{nominal}$—weight of core running with nominal frequency.

At 740, a total count, $n_{ACCL}$, of the candidate processor cores to receive the accelerated clock frequency is determined. Depending on the application, it may be desirable that different numbers of the active processor cores may be selected to receive the accelerated clock frequencies.

At 750, a frequency lookup index, fv, is determined as follows: $fv = CB_{avail}/n_{ACCL}$. In this example, it is assumed that each candidate processor core will operate at the same accelerated clock frequency. As a result, the available current budget is evenly divided by the number of candidate processor cores. In other example, the processor cores can receive different accelerated clock frequencies. In this case, the frequencies can be assigned according to available current budget and the number of candidate processor cores.

At 760, an accelerated operating clock frequency is selected from a lookup table, using the frequency lookup index, fv. Here the lookup table maps accelerated clock frequencies versus the frequency lookup index, fv, which represents the available electrical current budget per processor core. Examples of lookup tables are shown in FIG. 6, for example, lookup tables, 613, 643, and 650. In this example, all processor cores selected to have their clock frequency raised will receive the same accelerated frequency. Of course, the algorithm can be modified to allow different processor cores to receive different accelerated clock frequencies as long as the allocation can fit under the available electrical current budget. Changing of the clock frequency can be implemented by providing the selection circuit 316 in FIG. 3 with a signal to connect the PLL with the selected operating clock frequency to the designated processor cores.

Figure 8:
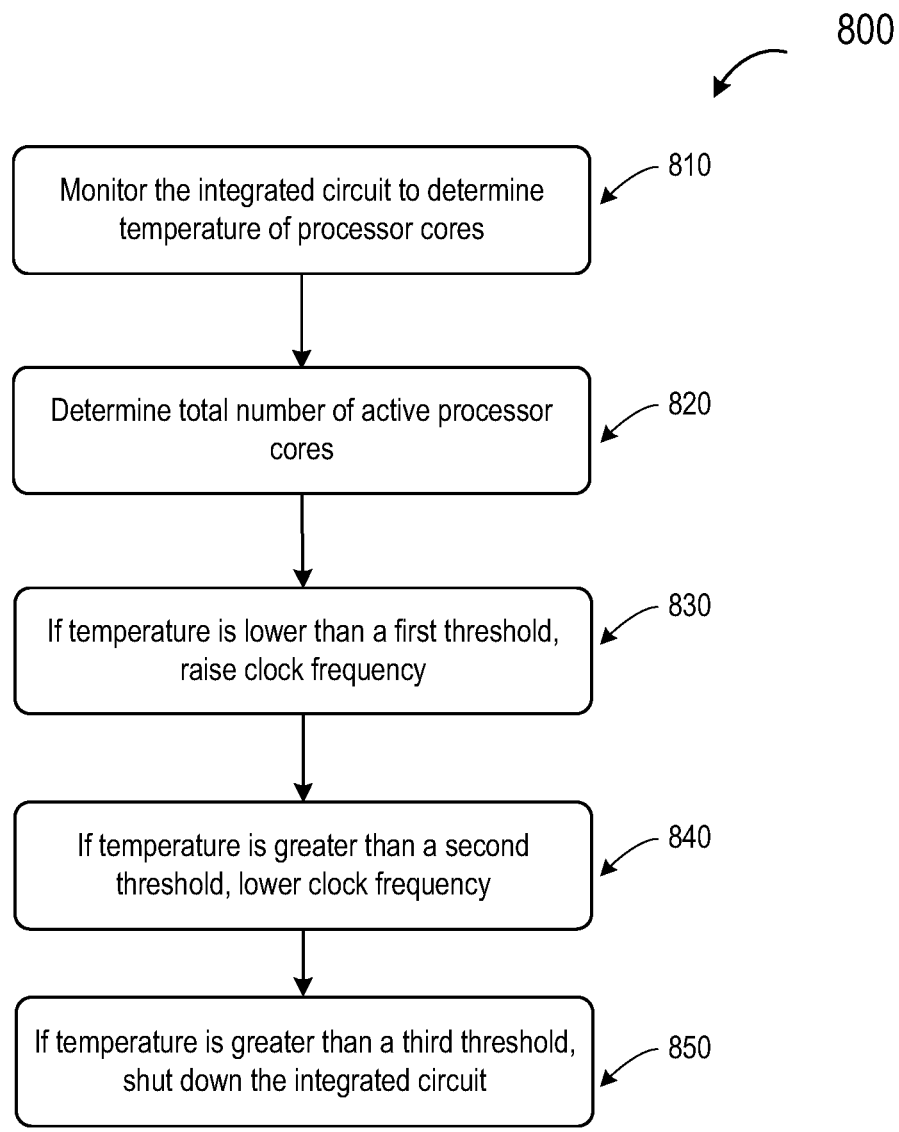
FIG. 8 is a flowchart illustrating a method for selecting operating clock frequency based on thermal conditions for a multi-core integrated circuit, according to certain aspects of the disclosure.

FIG. 8 is a flowchart illustrating a method for selecting operating clock frequency based on thermal conditions for a multi-core integrated circuit, according to certain aspects of the disclosure. Method 800 can be summarized below.

At 810, the thermal conditions of the integrated circuit are monitored to determine temperature of active processor cores. The thermal conditions can be monitored by the thermal monitor 220 of clock management unit 200 in FIG. 2. Alternatively, the thermal conditions can be monitored by an external thermal monitor 221 (e. g., a microcontroller) outside the integrated circuit to handle the thermal protection. The external thermal monitor can receive updates from the integrated circuit periodically. In case of an update time out, the integrated circuit can be shut down.

At 820, the total number of active processor cores is determined. The total number of active processor cores can be determined by the activity monitor 210 of clock management circuit 200 in FIG. 2. In the case of the external thermal monitor 221, the total number of active processor cores can be presented to the external thermal monitor 221 through a communication link (e. g., a PCI interface) between the integrated circuit and the external thermal monitor. The total number of active processor cores may be useful in selection of clock frequencies based on thermal considerations described below.

At 830, the temperature is compared with a first temperature threshold. If the temperature is lower than the first temperature threshold, the clock frequency of the processor cores can be raised. A clock frequency can be selected based on the temperature difference and the total number of active processor cores.

At 840, if the temperature is greater than a second threshold, the clock frequency of the processor cores can be lowered. A clock frequency can be selected based on the temperature difference and the total number of active processor cores.

At 850, if the temperature is greater than a third threshold representing a critical thermal condition, the integrated circuit can be shut down.

As described above in connection with FIG. 6, the new clock frequency selected by the process of FIG. 7 and the new clock frequency selected by the process of FIG. 8 are compared. The lower one of these two clock frequencies is used by the clock management unit 600 to apply to the processor cores.

Some or all of the methods described above in connection with FIGS. 5, 7, and 8 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 9:
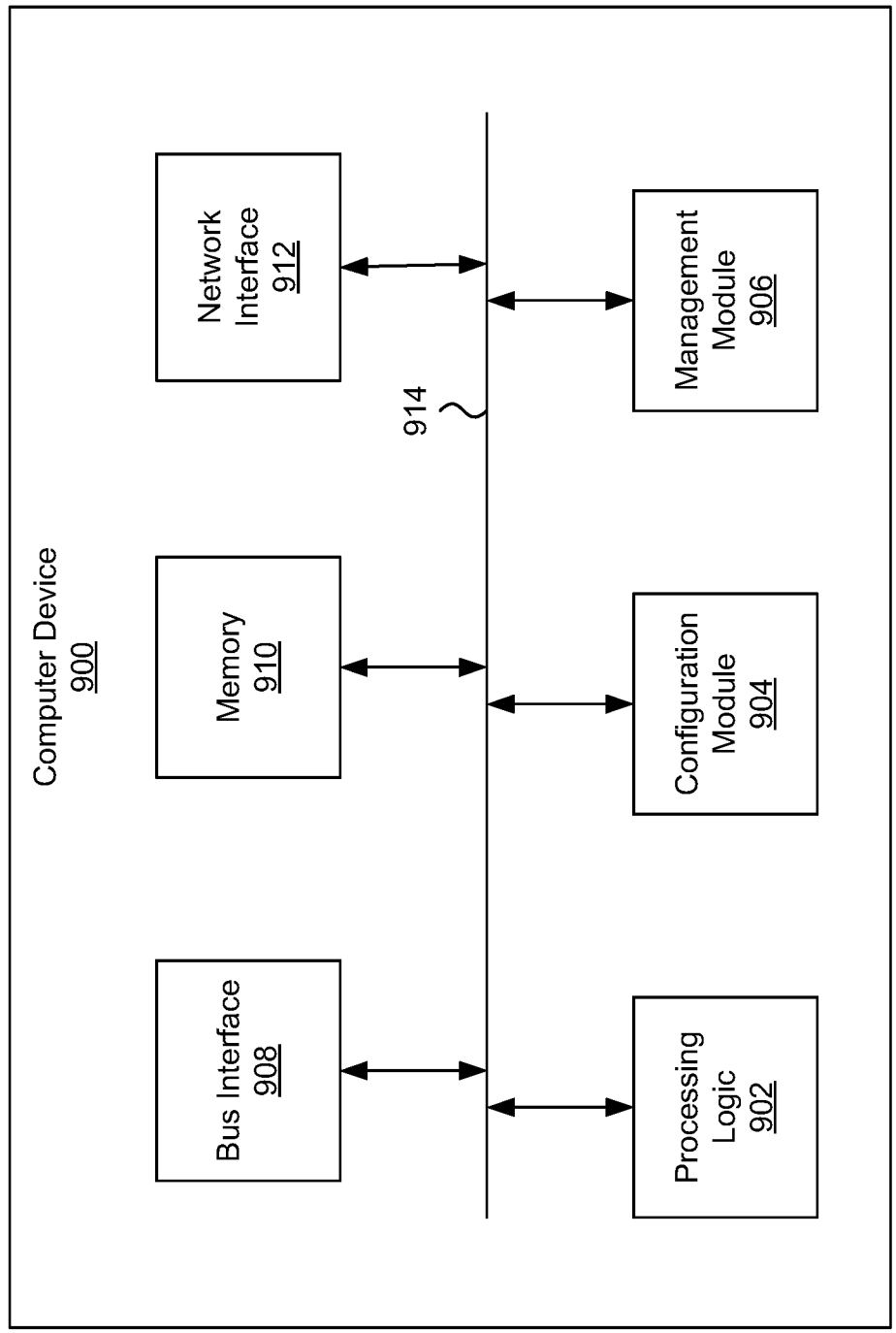
FIG. 9 illustrates an example of a computer device, according to certain aspects of the disclosure.

FIG. 9 illustrates an example of computer device 900. Functionality and/or several components of the computer device 900 may be used without limitation with other embodiments disclosed elsewhere in this disclosure, without limitations. For example, the multi-core integrated circuit 100 described above includes various components, such as a processing logic 120, a management module 121, a configuration module 123, a memory 125, a bus interface module 127, and a network interface module 129. These components may be similar to some of the components of computer device 900 described below. A computer device 900 may facilitate processing of packets and/or forwarding of packets from the computer device 900 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computer device 900 may be the recipient and/or generator of packets. In some implementations, the computer device 900 may modify the contents of the packet before forwarding the packet to another device. The computer device 900 may be a peripheral device coupled to another computer device, a switch, a router or any other suitable device enabled for receiving and forwarding packets.

In one example, the computer device 900 may include processing logic 902, a configuration module 904, a management module 906, a bus interface module 908, memory 910, and a network interface module 912. These modules may be hardware modules, software modules, or a combination of hardware and software. In certain instances, modules may be interchangeably used with components or engines, without deviating from the scope of the disclosure. The computer device 900 may include additional modules, not illustrated here, such as components discussed with respect to the nodes disclosed in FIG. 10. In some implementations, the computer device 900 may include fewer modules. In some implementations, one or more of the modules may be combined into one module. One or more of the modules may be in communication with each other over a communication channel 914. The communication channel 914 may include one or more busses, meshes, matrices, fabrics, a combination of these communication channels, or some other suitable communication channel.

The processing logic 902 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 902 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 902 may be stored on a computer-readable storage medium, for example, in the form of a computer program. The computer-readable storage medium may be non-transitory. In some cases, the computer-readable medium may be part of the memory 910.

The memory 910 may include either volatile or non-volatile, or both volatile and non-volatile types of memory. The memory 910 may, for example, include random access memory (RAM), read only memory (ROM), Electrically Erasable Programmable Read-Only Memory (EEPROM), flash memory, and/or some other suitable storage media. In some cases, some or all of the memory 910 may be internal to the computer device 900, while in other cases some or all of the memory may be external to the computer device 900. The memory 910 may store an operating system comprising executable instructions that, when executed by the processing logic 902, provides the execution environment for executing instructions providing networking functionality for the computer device 900. The memory may also store and maintain several data structures and routing tables for facilitating the functionality of the computer device 900.

In some implementations, the configuration module 904 may include one or more configuration registers. Configuration registers may control the operations of the computer device 900. In some implementations, one or more bits in the configuration register can represent certain capabilities of the computer device 900. Configuration registers may be programmed by instructions executing in the processing logic 902, and/or by an external entity, such as a host device, an operating system executing on a host device, and/or a remote device. The configuration module 904 may further include hardware and/or software that control the operations of the computer device 900.

In some implementations, the management module 906 may be configured to manage different components of the computer device 900. In some cases, the management module 906 may configure one or more bits in one or more configuration registers at power up, to enable or disable certain capabilities of the computer device 900. In certain implementations, the management module 906 may use processing resources from the processing logic 902. In other implementations, the management module 906 may have processing logic similar to the processing logic 902, but segmented away or implemented on a different power plane than the processing logic 902.

The bus interface module 908 may enable communication with external entities, such as a host device and/or other components in a computing system, over an external communication medium. The bus interface module 908 may include a physical interface for connecting to a cable, socket, port, or other connection to the external communication medium. The bus interface module 908 may further include hardware and/or software to manage incoming and outgoing transactions. The bus interface module 908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 908 may include the physical layer for any of these bus protocols, including a connector, power management, and error handling, among other things. In some implementations, the computer device 900 may include multiple bus interface modules for communicating with multiple external entities. These multiple bus interface modules may implement the same local bus protocol, different local bus protocols, or a combination of the same and different bus protocols.

The network interface module 912 may include hardware and/or software for communicating with a network. This network interface module 912 may, for example, include physical connectors or physical ports for wired connection to a network, and/or antennas for wireless communication to a network. The network interface module 912 may further include hardware and/or software configured to implement a network protocol stack. The network interface module 912 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computer device 900 may include multiple network interface modules, each configured to communicate with a different network. For example, in these implementations, the computer device 900 may include a network interface module for communicating with a wired Ethernet network, a wireless 802.11 network, a cellular network, an Infiniband network, etc.

The various components and modules of the computer device 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method, comprising:
   determining a minimum allowable operating clock frequency and a maximum allowable operating clock frequency for an integrated circuit having N processor cores and M multiple phase locked loops (PLLs), wherein N and M are integers, the integrated circuit further including N multiplexers, each of which is an M-to-1 multiplexer coupling the M PLLs to each of the N processor cores;
   configuring the M PLLs to provide M pre-set clock frequencies between the minimum allowable operating clock frequency and the maximum allowable operating clock frequency;
   determining a total number of active processor cores;
   upon determining that all of the N processor cores are active, operating the integrated circuit with all of the N processor cores at the minimum allowable operating clock frequency;
   upon determining that the total number of active processor cores is lower than a threshold number, coupling one or more active processor cores to one of the M PLLs that provides a clock frequency higher than the minimum allowable operating clock frequency;
   determining a temperature of the integrated circuit;
   upon determining that the temperature of the integrated circuit is below a first temperature threshold, coupling the active processor cores to one of the M PLLs that provides a clock frequency higher than the minimum allowable operating clock frequency;
   upon determining that the temperature of the integrated circuit is above a second temperature threshold, coupling the active processor cores to one of the M PLLs that provides the minimum allowable operating clock frequency; and
   upon determining that the temperature of the integrated circuit is above a third temperature threshold, powering down the integrated circuit.

2. The method of claim 1, further comprising selecting a clock frequency higher than the minimum allowable operating clock frequency based on an available electrical current budget.

3. The method of claim 2, further comprising selecting a clock frequency higher than the minimum allowable operating clock frequency based on a lookup table that associates the available electrical current budget with a corresponding clock frequency between the minimum allowable operating clock frequency and the maximum allowable operating clock frequency, the available electrical current budget being a portion of a total electrical current budget.

4. The method of claim 1, further comprising determining the temperature of the integrated circuit using one or more temperature sensors on the integrated circuit.

5. The method of claim 1, further comprising monitoring the temperature of the integrated circuit and selecting an operating clock frequency using a control circuit external to the integrated circuit.

6. A method, comprising:
   determining a minimum allowable operating clock frequency and a maximum allowable operating clock frequency for an integrated circuit having a plurality of processor cores;
   configuring a plurality of clock sources to provide a corresponding plurality of clock frequencies between the minimum allowable operating clock frequency and the maximum allowable operating clock frequency;
   determining a total number of active processor cores;
   determining a temperature of the integrated circuit;
   if all of the plurality of processor cores are active, operating all active processor cores at the minimum allowable operating clock frequency;
   if the total number of active processor cores is lower than a threshold number, increasing a clock frequency of one or more active processor cores based on an available electrical current budget; and if the temperature of the integrated circuit is below a temperature limit, increasing a clock frequency of the active processor cores based on the temperature of the integrated circuit.

7. The method of claim 6, wherein determining the total number of active processor cores comprises monitoring a state of each of the plurality of processor cores.

8. The method of claim 6, further comprising associating each of the corresponding plurality of clock frequencies with the available electrical current budget for the active processor cores in a lookup table.

9. The method of claim 8, wherein increasing the clock frequency of one or more active processor cores comprises:
selecting a clock frequency higher than the minimum allowable operating clock frequency based on the lookup table that associates the available electrical current budget with a corresponding clock frequency, the corresponding clock frequency being between the minimum allowable operating clock frequency and the maximum allowable operating clock frequency, the available electrical current budget being a portion of a total electrical current budget.

10. The method of claim 6, further comprising:
determining a temperature for each of a plurality of regions of the integrated circuit; and
upon determining that the temperature of a given region of the integrated circuit is below a second temperature limit, increasing a clock frequency of processor cores in the given region based on the temperature of the given region of the integrated circuit.

11. The method of claim 10, further comprising:
determining the temperature for each of the plurality of regions of the integrated circuit using one or more temperature sensors; and
controlling clock frequency changes of the processor cores from a controller external to the integrated circuit.

12. An integrated circuit, comprising:
a plurality of processor cores;
a plurality of clock sources, each one of the plurality of clock sources providing one of a plurality of clock signals having clock frequencies between a minimum allowable operating clock frequency and a maximum allowable operating clock frequency;
a selection circuit coupling each one of the plurality of clock sources to each one of the plurality of processor cores;
a processor clock management circuit coupled to the plurality of processor cores and to the selection circuit;
wherein the processor clock management circuit is configured to:
determine a total number of active processor cores;
determine a temperature of the integrated circuit;
if all of plurality of processor cores are active, provide all the processor cores with a first clock signal having the minimum allowable operating clock frequency;
if the total number of active processor cores is less than a threshold number, provide one or more active processor cores with a second clock signal having a clock frequency higher than the clock frequency of the first clock signal; and
if the temperature of the integrated circuit is below a temperature limit, provide one or more active processor cores with a third clock signal having a clock frequency higher than the clock frequency of the first clock signal.

13. The integrated circuit of claim 12, wherein the plurality of clock sources comprises a plurality of PLLs (phase-locked loops), each clock source configured to provide a clock frequency between the minimum allowable operating clock frequency and the maximum allowable operating clock frequency.

14. The integrated circuit of claim 12, wherein the processor clock management circuit comprises a switching circuit that includes one multiplexer for each processor core of the plurality of processor cores for selectively coupling any one of the plurality of clock sources to the processor core.

15. The integrated circuit of claim 12, wherein the processor clock management circuit comprises a global lookup table (LUT) that associates global clock speed limits with an available electrical current budget and a total number of processor cores in the integrated circuit selected for receiving higher clock frequencies.

16. The integrated circuit of claim 15, wherein the plurality of processor cores are grouped into multiple subsets, and the processor clock management circuit further comprises a lookup table (LUT) for each of the multiple subsets that associates local clock speed limits with the available electrical current budget and a number of processor cores in a given subset of processor cores selected for receiving higher clock frequencies.

17. The integrated circuit of claim 16, wherein the processor clock management circuit is configured to determine a clock frequency select signal based on a minimum of the global clock speed limits and the local clock speed limits for the multiple subsets.

18. The integrated circuit of claim 12, wherein the processor clock management circuit is configured to determine a temperature of each of multiple regions in the integrated circuit, and provide a higher clock frequency for processor cores in a given region if the temperature of the given region is below a second temperature limit.

* * * * *

UNITED STATES PATENT AND TRADEMARK OFFICE
CERTIFICATE OF CORRECTION

PATENT NO. : 11,106,267 B2
APPLICATION NO. : 16/698525
DATED : August 31, 2021
INVENTOR(S) : Larisa Goffman-Vinopal et al.

Page 1 of 1

It is certified that error appears in the above-identified patent and that said Letters Patent is hereby corrected as shown below:

In the Claims

Column 18, Lines 1-2 in Claim 12: change "if all of plurality of processor cores are active, provide all the processor cores" to --if all of the plurality of processor cores are active, provide all of the processor cores--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*